United States Patent
Kamura et al.

[11] Patent Number: 5,832,893
[45] Date of Patent: Nov. 10, 1998

[54] CONTROL SYSTEM FOR INTERNAL COMBUSTION ENGINE

[75] Inventors: Hitoshi Kamura; Kenjiro Hatayama, both of Kyoto; Toshiro Nomura, Okazaki; Hiroki Tamura, Hoi-gun, all of Japan

[73] Assignee: Mitsubishi Jidosha Kogyo Kabushiki Kaisha, Tokyo, Japan

[21] Appl. No.: 905,951

[22] Filed: Aug. 5, 1997

[30] Foreign Application Priority Data

Aug. 9, 1996 [JP] Japan .................................. 8-210806

[51] Int. Cl.[6] ...................................................... F02B 5/00
[52] U.S. Cl. ............................................................ 123/305
[58] Field of Search ................................... 123/305, 447, 123/506, 339.12, 736, 478, 257

[56] References Cited

U.S. PATENT DOCUMENTS

| | | | |
|---|---|---|---|
| 5,305,720 | 4/1994 | Ando et al. | 123/193.4 |
| 5,626,115 | 5/1997 | Kawaguchi | 123/305 |
| 5,628,290 | 5/1997 | Iida et al. | 123/305 |
| 5,699,766 | 12/1997 | Saito | 123/257 |
| 5,720,254 | 2/1998 | Yoshida et al. | 123/305 |

*Primary Examiner*—Raymond A. Nelli

[57] ABSTRACT

In an intra-cylinder injection type engine, a first fuel cut-off starting rotational speed, a first return rotational speed and a first target idling speed in a compression stroke injection mode, which is superior in both combustion and responsivity, are set at lower speeds than a second fuel cut-off starting rotational speed, a second return rotational speed, and a second target idling speed in a suction stroke injection mode. During an operation in the compression stroke injection mode, a fuel cut-off mode and an idle running of the engine are practiced at a low engine speed, to improve the fuel economy without causing deterioration of combustion.

16 Claims, 4 Drawing Sheets

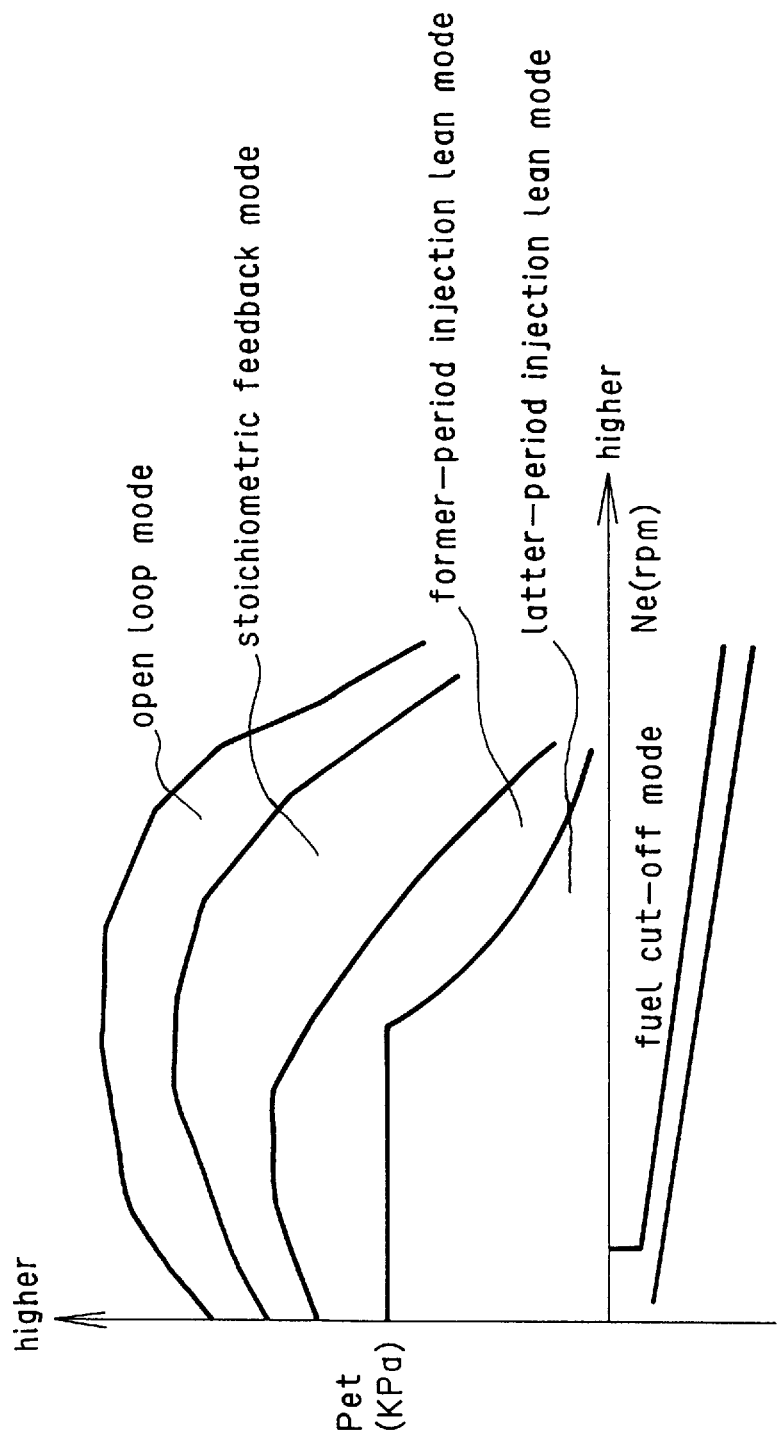

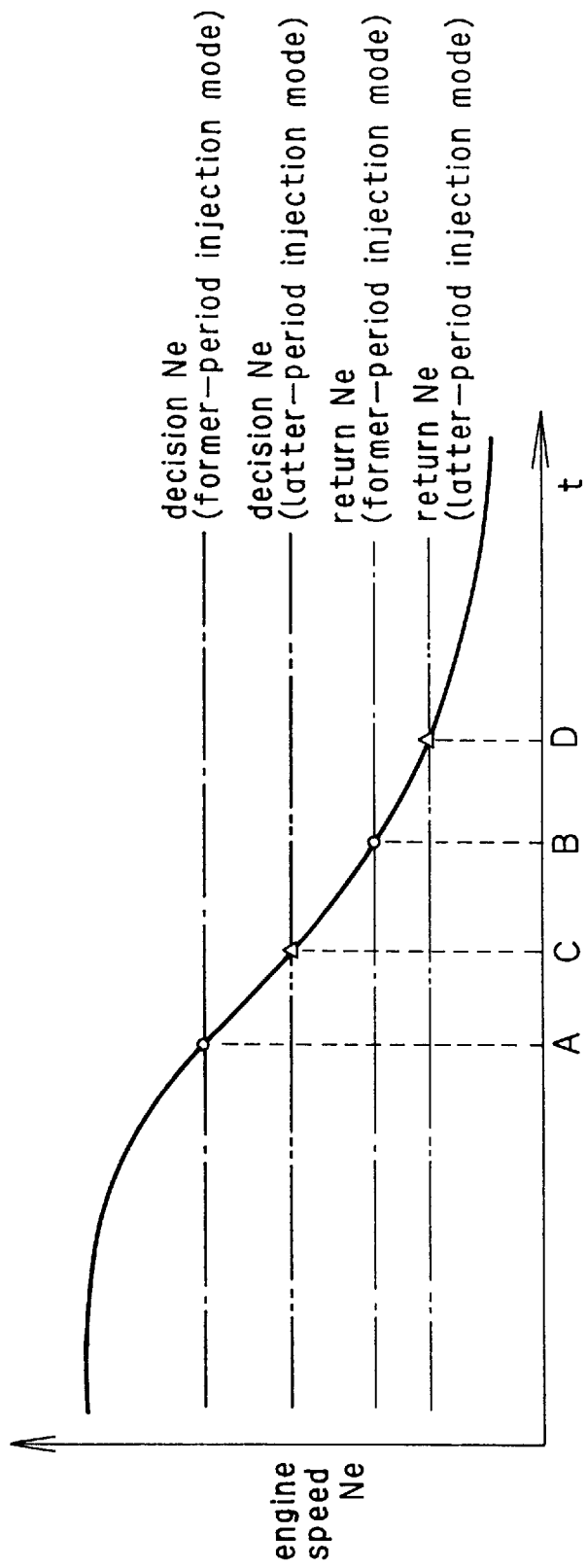

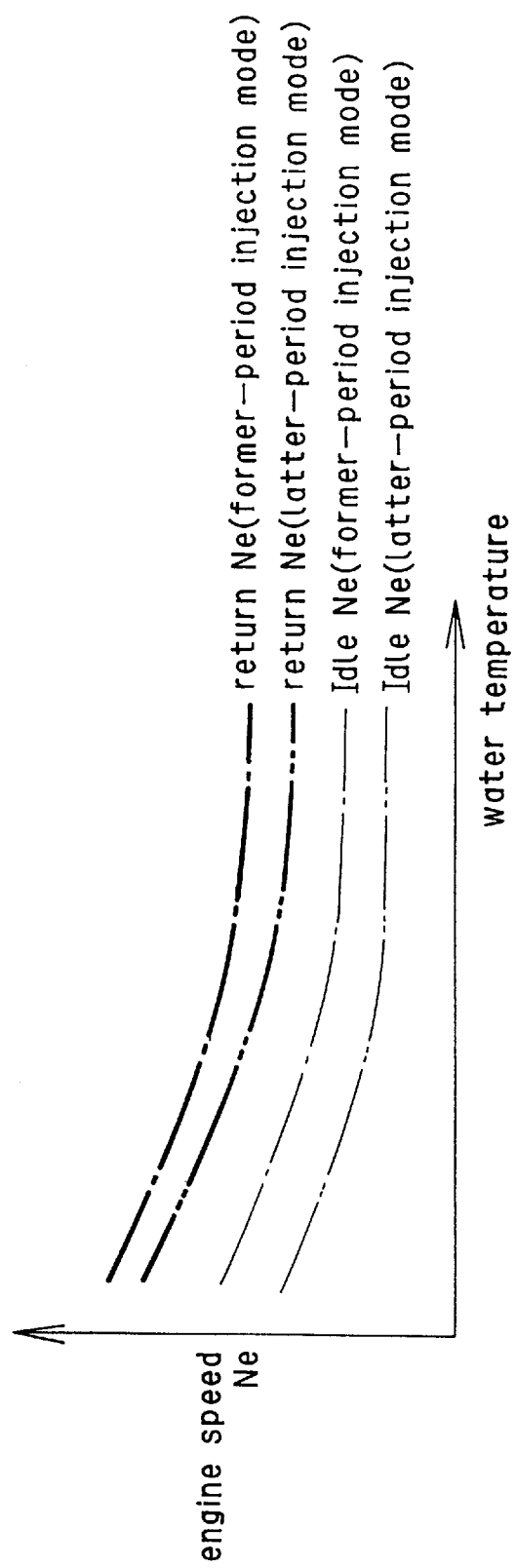

CONTROL SYSTEM FOR INTERNAL COMBUSTION ENGINE

FIELD OF THE INVENTION

The present invention relates to a control system for an intra-cylinder injection type internal combustion engine in which fuel is injected directly into a combustion chamber. In the present invention it is intended to prevent deterioration of combustion and thereby improve the fuel economy.

BACKGROUND OF THE INVENTION

Recently, for the purpose of diminishing noxious exhaust gas components and improving the fuel economy, there have been proposed various intra-cylinder injection type multi-cylinder engines in which fuel is injected directly into a combustion chamber (see, for example, Japanese Patent Laid Open No.240044/93). In an intra-cylinder injection type multi-cylinder engine a change-over is made between a suction stroke injection mode in which fuel injection is performed mainly in the suction stroke and a compression stroke injection mode in which fuel injection is performed mainly in the compression stroke, according to operating conditions.

Also in an intra-cylinder injection type multi-cylinder engine, like in an intake pipe injection engine, a control (a fuel cut-off mode) for stopping the supply of fuel to a combustion chamber of the engine according to operating conditions takes place, and a decision rotational speed for starting the cut-off of fuel in a fuel cut-off mode, as well as a fuel return rotational speed for returning from the fuel cut-off mode and restarting the supply of fuel, are preset to predetermined rotational speeds. Idling speed is also preset to a predetermined rotational speed. The decision rotational speed, the fuel return rotational speed, and the idling speed are set according to whether a transmission is a manual or an automatic and also according to whether the operation of an air conditioner or any other auxiliary device.

For example, for each of the manual and automatic transmissions, a decision rotational speed for starting the cut-off of fuel is set according to whether an air conditioner or any other auxiliary device is on or off. Further, at each of neutral position in the manual and automatic transmissions and a drive position in the automatic transmission, an idling speed is set according to whether the operation of an air conditioner or any other auxiliary device is on or off. Thus, by setting the fuel cut-off starting decision rotational speed, the fuel return rotational speed and the idling speed for each operation mode, an optimum rotational speed according to the type of a transmission and the state of its operation is obtained, whereby it is possible to improve the fuel economy.

In an intra-cylinder injection type multi-cylinder engine, a fuel cut-off mode is practiced according to the state of operation, and a decision rotational speed which permits the start of fuel cut-off on a low engine speed side, a fuel return rotational speed, and further an idling speed are set finely, according to the operating conditions, to improve the fuel economy. Improvement of the fuel economy is also obtained by setting the air-fuel ratio on a leaner side than the stoichiometric ratio, that is, by setting it at a lean air-fuel ratio. Recently, however, the demand for energy saving has become more and more keen, and a further improvement of fuel economy is now desired even for an intra-cylinder injection type multi-cylinder engine.

The present invention has been accomplished in view of the above-mentioned circumstances and it is an object of the invention to provide a control system for internal combustion engine which improves the fuel economy without deterioration of combustion.

SUMMARY OF THE INVENTION

According to the present invention, in order to achieve the above-mentioned object, there is provided a control system for internal combustion engine, comprising:

a fuel injection device for supplying a supply of fuel directly into a combustion chamber of the internal combustion engine;

injection mode selecting means for selecting, according to a state of operation of the internal combustion engine, either a suction stroke injection mode in which a fuel injection is performed mainly in a suction stroke or a compression stoke injection mode in which the fuel injection is performed mainly in a compression stroke;

fuel injection control means for controlling the fuel injection device in accordance with the injection mode selected by the injection mode selecting means; and idling speed setting means for setting a first target idling speed for the compression stroke injection mode and a second target idling speed for the suction stroke injection mode, the idling speed setting means setting the first target idling speed at a lower speed than the second target idling speed.

Thus, since the idling speed in the compression stroke injection mode superior in both combustion and responsivity is set lower than the idling speed in the suction stroke injection mode, idling is set at a low engine speed during operation in the compression stroke injection mode. As a result, a fuel economy can be improved without deterioration of combustion.

During an idling state of the internal combustion engine, the injection mode selecting means selects the compression stroke injection mode in a normal operating condition of the internal combustion engine and selects the suction stroke injection mode in a specific operating condition of the engine. The specific operating condition indicates a low temperature condition of the internal combustion engine or a fail safe condition against a trouble of at least one of various sensors or a trouble of a control based on the outputs of various sensors.

The idling speed setting means sets the first and second target idling speeds according to operating conditions of a load member which exerts an influence on an output of the internal combustion engine and which is driven by an output shaft of the engine.

The internal combustion engine is provided with temperature detecting means for detecting temperature of the engine, wherein the idling speed setting means sets respectively the first and second target idling speeds on the basis of the temperature detected by the temperature detecting means.

On a high engine temperature side the idling speed setting means sets respectively the first and second target idling speeds at lower speeds than on a low engine temperature side.

Further, according to the present invention, in order to achieve the foregoing object, there is provided a control system for internal combustion engine, comprising:

a fuel injection device for supplying a fuel directly into a combustion chamber of the internal combustion engine;

injection mode selecting means for selecting, according to a state of an operation of the internal combustion engine, either of a suction stroke injection mode in which a fuel injection is performed mainly in a suction stroke, a compression stroke injection mode in which a fuel injection is performed mainly in a compression stroke, and a fuel cut-off mode for stopping the injection of fuel;

fuel injection control means for controlling the fuel injection device in accordance with the suction stroke injection mode, the compression stroke injection mode, or the fuel cut-off mode, selected by the injection mode selecting means; and return rotational speed setting means for setting a first return rotational speed for restarting the supply of fuel at the time of return from the fuel cut-off mode to the compression stroke injection mode and a second return rotational speed for restarting the supply of fuel at the time of return from the fuel cut-off mode to the suction stroke injection mode, the return rotational speed setting means setting the first rotational speed at a lower speed than the second return rotational speed.

Thus, the return rotational speed for return from the fuel cut-off mode and restarting the supply of fuel is set in each of the suction stroke injection mode and the compression stroke injection mode, and the return rotational speed in the compression stroke injection mode, superior in both combustion and responsivity, is set lower than that in the suction stroke injection mode. Therefore, during operation in the compression stroke injection mode, the fuel cut-off mode can be practiced at a low rotational speed. As a result, fuel economy can be improved without deterioration of combustion.

At the time of selecting an injection mode for restarting the supply of fuel from the fuel cut-off mode, the injection mode selecting means selects the compression stroke injection mode in a normal operating condition of the internal combustion engine, while in a specific operating condition of the engine, the injection mode selecting means selects the suction stroke injection mode.

The specific operating condition indicates a low temperature condition of the internal combustion engine or a fail safe condition against some trouble of any one of various sensors or some trouble in the control based on outputs of the various sensors.

The internal combustion engine has a plurality of cylinders, and at the time of restarting the supply of fuel for return from the fuel cut-off mode to the compression stroke injection mode, the return rotational speed setting means sets the return rotational speed for restarting the supply of fuel to any of the plural cylinders at a higher level by a predetermined value than the first return rotational speed.

At this time, by restarting the supply of fuel to any of the plural cylinders at a predetermined rotational speed higher than the first return rotational speed thus set, it is possible to diminish the torque shock at the time of return from the fuel cut-off mode and also possible to set still lower the first return rotational speed in the compression stroke injection mode.

The internal combustion engine is provided with fuel cut-off lower-limit rotational speed setting means for setting a first fuel cut-off lower-limit rotational speed which, at a low rotational speed of the engine, permits change-over from the compression stroke injection mode to the fuel cut-off mode, and for setting a second fuel cut-off lower-limit rotational speed which, at the above low rotational speed of the engine, permits change-over from the suction stroke injection mode to the fuel cut-off mode, wherein the fuel cut-off lower-limit rotational speed setting means setting the first fuel cut-off lower-limit rotational speed lower than the second fuel cut-off lower-limit rotational speed.

The return rotational speed setting means selectively sets the first and second return rotational speeds according to operating conditions of a load member which exerts an influence on an output of the internal combustion engine and which is driven by an output shaft of the engine.

The internal combustion engine is further provided with temperature detecting means for detecting temperature of the engine, wherein the return rotational speed setting means sets respectively the first and second return rotational speeds on the basis of the temperature detected by the temperature detecting means.

The return rotational speed setting means sets respectively the first and second return rotational speeds at a lower value on a high engine temperature side than on a low engine temperature side.

Further, according to the present invention, in order to achieve the foregoing object, there is provided a control system for internal combustion engine, comprising:

a fuel injection device for supplying a fuel directly into a combustion chamber of the internal combustion engine;

injection mode selecting means for selecting, according to the state of operation of the internal combustion engine, one of a suction stroke injection mode in which a fuel injection is performed mainly in a suction stroke, a compression stroke injection mode in which the fuel injection is performed mainly in a compression stroke, and a fuel cut-off mode for stopping the injection of fuel;

fuel injection control means for controlling the fuel injection device in accordance with the suction stroke injection mode, the compression stroke injection mode, or the fuel cut-off mode, selected by the injection mode selecting means; and fuel cut-off rotational speed setting means for setting a first fuel cut-off starting rotational speed for stopping the supply of fuel at the time of starting the fuel cut-off mode from the compression stroke injection mode and a second fuel cut-off starting rotational speed for stopping the supply of fuel at the time of starting the fuel cut-off mode from the suction stroke injection mode, the fuel cut-off rotational speed setting means setting the first fuel cut-off starting rotational speed at a lower speed than the second fuel cut-off starting rotational speed.

Thus, the lower-limit rotational speed which permits the start of fuel cut-off on the low engine speed side is set in each of the suction stroke injection mode and the compression stroke injection mode, and the first fuel cut-off lower-limit rotational speed in the compression stroke injection mode superior in both combustion and responsivity is set lower than the second fuel cut-off lower-limit rotational speed in the suction stroke injection mode. Accordingly, during operation in the compression stroke injection mode, the fuel cut-off mode can be practiced on the low rotational speed side. As a result, not only the fuel cut-off mode can be practiced on the low engine speed side, but also a fuel economy can be improved without deterioration of combustion.

The fuel cut-off lower-limit rotational speed setting means selectively sets the first and second fuel cut-off lower-limit rotational speeds according to operating conditions of a load member which exerts an influence on an output of the internal combustion engine and which is driven by an output shaft of the engine.

BRIEF DESCRIPTION OF THE DRAWINGS

FIG. 2 is a fuel injection control map;

FIG. 3 is a graph showing in what state a decision rotational speed and a return rotational speed are set; and FIG. 4 is a graph showing in what state a return rotational speed and an idling speed are set.

DETAILED DESCRIPTION OF THE EMBODIMENT

Figure 1:
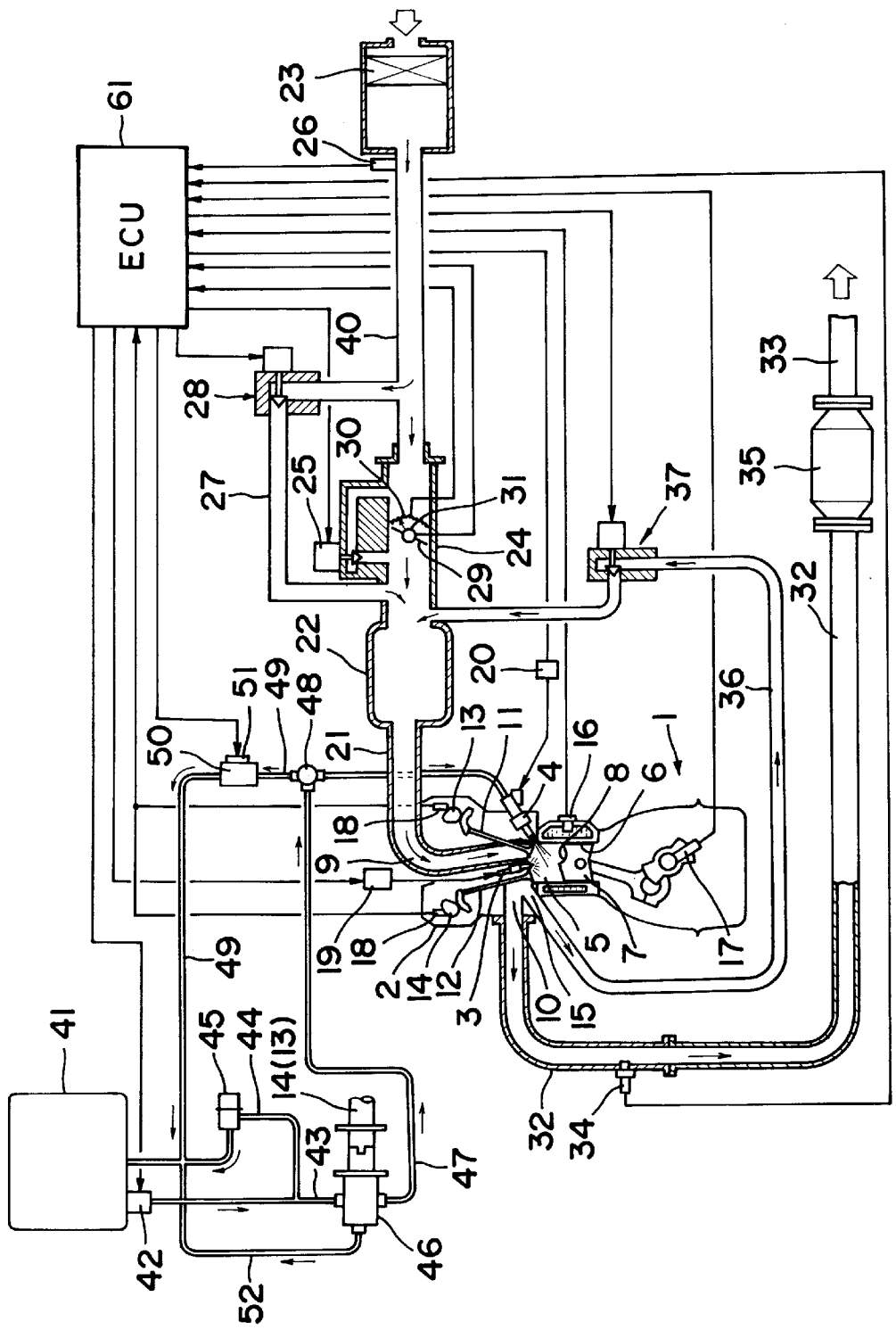
FIG. 1 is a schematic construction diagram of an intra-cylinder injection type multi-cylinder internal combustion engine provided with a control system according to an embodiment of the present invention.

A control system for internal combustion engine embodying the present invention will be described in detail hereinunder with reference to the accompanying drawings. As an example, the internal combustion engine is an intra-cylinder injection type multi-cylinder internal combustion engine in which fuel is injected directly into a combustion chamber.

The construction of the internal combustion engine will now be described with reference to FIG. 1. For example, the intra-cylinder injection type multi-cylinder internal combustion engine to which the control system is applied is an intra-cylinder injection type straight four-cylinder gasoline engine (intra-cylinder injection engine) 1 in which fuel is injected directly into a combustion chamber. In the intra-cylinder injection engine 1, a combustion chamber, an intake device, and an exhaust gas recirculation device (EGR device) are specially designed for intra-cylinder injection.

For each cylinder a spark plug 3 is mounted on a cylinder head 2 of the intra-cylinder injection engine 1, and also mounted for each cylinder to the cylinder head is an electromagnetic type fuel injection valve 4 which serves as fuel supply means. A nozzle of the fuel injection valve 4 is open into a combustion chamber 5 so that a fuel injected from the fuel injection valve 4 through a driver 20 is directed into the combustion chamber 5 directly. A piston 7 is fitted vertically slidably into each cylinder 6 of the engine 1, with a semispherically recessed cavity 8 being formed in the top portion of the piston 7. The cavity 8 promotes the generation of a reverse tumble flow (a clockwise intake flow in the combustion chamber 5 in FIG. 1) reverse to the ordinary intake tumble flow from an intake port which will be described later. By this reverse tumble flow, mist particles of the fuel injected from the fuel injection valve are collected near the spark plug 3 in a satisfactory manner. Consequently, at the time of an ignition, an air-fuel mixture of a substantially stoichiometric ratio, or an overrich mixture, and an extremely lean mixture present around a rich mixture, are formed as layers around the spark plug 3.

In the cylinder head 2, an intake port 9 and an exhaust port 10 both facing the combustion chamber 5 are formed. The intake port 9 is opened and closed by an operation of an intake valve 11, while the exhaust port 10 is opened and closed by an operation of an exhaust valve 12. In the upper portion of the cylinder head 2, an intake-side cam shaft 13 and an exhaust-side cam shaft 14 are rotatably supported. The intake valve 11 is operated by a rotation of the intake-side cam shaft 13, while the exhaust valve 12 is operated by a rotation of the exhaust-side cam shaft 14. An exhaust gas recirculation portion (EGR port) 15 of a large diameter is branched obliquely downward from the exhaust port 10.

A water temperature sensor 16 for detecting the temperature of a cooling water is disposed near the cylinders 6 of the intra-cylinder injection engine 1. Also provided is a crank angle sensor 17 of a vane type which outputs a crank angle signal SGT at a predetermined crank position (e.x. 75° BTDC and 5° BTDC)in each cylinder. The crank angle sensor 17 can also detect the engine speed. The cam shafts 13 and 14, which rotate at ½ revolutions of the cam shaft, are each provided with a discrimination sensor 18 which outputs a cylinder identification signal SGC. With the cylinder identification signal SGC it is made possible to discriminate of which cylinder the crank angle signal SGT is. The numeral 19 denotes an ignition coil for applying a high voltage to the spark plug 3.

An intake pipe 40 is connected to the intake port 9 through an intake manifold 21, and a surge tank 22 is provided in the intake manifold 21. The intake pipe 40 is provided with an air cleaner 23, a throttle body 24, a first air bypass valve 25 of a stepping motor type, and an air flow sensor 26. As the air flow sensor 26, which is for detecting the amount of intake air, a karman vortex type flow sensor is used, for example. If a boost pressure sensor is attached to the surge tank 22, the amount of intake air can be determined from the difference between an intake pipe pressure detected by the boost pressure sensor and the atmospheric pressure and also from the engine speed.

To the intake pipe 40 is attached an air bypass pipe 27 of a large diameter for intaking air to the intake manifold 21 while bypassing the throttle body 24. The air bypass pipe 27 is provided with a second air bypass valve 28 of a linear solenoid type. The air bypass pipe 27 has a flow path area corresponding to that of the intake pipe 40, so that, when the second air bypass valve 28 is fully open, it is possible to intake air in an amount required in low and medium speed ranges of the intra-cylinder injection engine 1.

The throttle body 24 is provided with a butterfly type throttle valve 29 for opening and closing the flow path and is also provided with a throttle position sensor 30 for detecting the degree of opening of the throttle valve 29. The throttle position sensor 30 outputs a throttle voltage proportional to the degree of opening of the throttle valve 29. Thus, the degree of opening of the throttle valve 29 is detected on the basis of the throttle voltage output. The throttle body 24 is further provided with an idle switch 31 for detecting a fully closed state of the throttle valve 29 and perceiving an idling state of the engine 1.

On the other hand, an exhaust pipe 33 is connected to the exhaust port 10 through an exhaust manifold 32, and an $O_2$ sensor 34 is attached to the exhaust manifold 32. The exhaust pipe 33 is provided with a three-way catalytic converter 35 and a muffler (not shown). The EGR port 15 is connected to an upstream side of the intake manifold 21 through an EGR pipe 36 of a large diameter. Further, a stepping motor type EGR valve 37 is provided in the EGR pipe 36.

Fuel is stored in a fuel tank 41 and it is sucked up by a low pressure fuel motor pump 42 and is fed to the engine 1 through a low pressure feed pipe 43. The pressure of the fuel present in the low pressure feed pipe 43 is adjusted to a relatively low pressure(low fuel pressure) by means of a first fuel pressure regulator 45 mounted on a return pipe 44. The fuel thus fed to the engine 1 is then fed to each fuel injection valve 4 through a high pressure feed pipe 47 and a delivery pipe 48 by means of a high pressure fuel pump 46.

The high pressure fuel pump 46 is, for example, a swash plate type axial piston pump and is driven by the exhaust-side cam shaft 14 or the intake-side cam shaft 13 so that a discharge pressure of a predetermined level or higher can be generated even during idling of the engine 1. The fuel pressure in the delivery pipe 48 is adjusted to a relatively high pressure (high fuel pressure) by means of a second fuel pressure regulator 50 provided in a return pipe 49.

An electromagnetic type fuel pressure change-over valve 51 is attached to the second fuel pressure regulator 50. When turned ON, the fuel pressure change-over valve 51 releases the fuel and can thereby decrease the fuel pressure in the delivery pipe 48. The numeral 52 in the figure denotes a return pipe for recirculating part of the fuel, which has been used for lubricating or cooling the high-pressure fuel pump 46, to the fuel tank 41.

The vehicle concerned is provided with an electronic control unit (ECU) 61 as the control system. The ECU 61 is provided with an input/output device, a memory for storing control programs and control maps, a central processing unit, and timers and counters. An overall control for the engine 1 is performed by the ECU 61. Information detected by the sensors referred to above are inputted to the ECU 61, which in turn, in accordance with such information pieces, determines not only the fuel injection mode and the amount of fuel to be injected but also an ignition timing and the amount of EGR gas to be introduced, and controls the operation of the driver 20 for the fuel injection valve 4, the ignition coil 19, and EGR valve 37.

To the input side of the ECU 61, not only the foregoing various sensors but also a large number of switches (not shown) are connected, and warning means and devices (not shown) are also connected to the output side of the ECU 61.

When the driver turns ON the ignition key in a cold state of the intra-cylinder injection engine 1, the low pressure fuel pump 42 and the fuel pressure change-over valve 51 are turned ON and the fuel which is low in pressure is fed to the fuel injection valve 4. Next, when the driver turns the ignition key to the start position, the engine 1 is cranked by means of a self starter motor (not shown) and at the same time a fuel injection control is started by the ECU 61.

At this time, the ECU 61 selects a former-period injection mode (a fuel injection mode in the suction stroke), in which fuel is injected to give a relatively rich air-fuel ratio.

In such a start-up condition, the second air bypass valve 28 is substantially fully closed. Therefore, the intake of air to the combustion chamber 5 is performed through a clearance defined by the throttle valve 29 or through the first air bypass valve 25.

When the start-up of the engine 1 is completed and the engine starts idling at a predetermined rotational speed, a rated discharge operation of the high pressure fuel pump 46 is started and the fuel pressure change-over valve 51 is turned off by the ECU 61, so that the fuel, which is high in pressure, is fed to the fuel injection valve 4. At this time, the amount of fuel to be injected is determined from, for example, the fuel pressure set for the second fuel pressure regulator 50, or the fuel pressure detected by the fuel pressure sensor which detects the fuel pressure in the delivery pipe 48, and also from the valve opening time of the fuel injection valve 4.

Until the cooling water temperature detected by the water temperature sensor 16 rises up to a predetermined value, the former-period injection mode is selected as in the start-up condition and fuel is injected. The control of idling speed according to an increase or decrease of load on auxiliary devices such as air conditioner is conducted by the first air bypass valve 25. When the $O_2$ sensor 34 is activated with lapse of a predetermined cycle, an air-fuel ratio feedback control is started in accordance with the output voltage of the $O_2$ sensor.

As a result, toxic exhaust gas components are purified to a satisfactory extent by the three-way catalytic converter 35.

When warming-up of the intra-cylinder injection engine 1 is completed, the ECU 16 retrieves the present fuel injection area from the fuel injection map of FIG. 2 and determines a fuel injection mode (injection mode selecting means) on the basis of a target output correlation value obtained from the throttle voltage proportional to the degree of opening of the throttle valve 29, e.x. a target average effective pressure, Pet, and the engine speed, Ne. In this way, the amount of fuel to be injected, which is proportional to the target air-fuel ratio in each fuel injection mode, is determined. Then, in accordance with the thus-determined amount of fuel, the operation of the fuel injection valve 4 is controlled and, at the same time, the operation of the ignition coil 19 is controlled. On-off control is also made for the first and second air bypass valves 25,28 and the EGR valve 37. The first and second air bypass valves 25,28 are controlled in a unitary manner by the ECU 61, and to what degree each valve is to be opened is determined according to the amount of intake air which is to bypass the throttle valve 29.

In a low load region as in an idling or a low-speed running, a latter-period injection lean mode shown in FIG. 2 is selected as a fuel injection area. In this case, the first and second air bypass valves 25,28 are controlled and a target air-fuel ratio, corresponding to the target average effective pressure Pet, is set on the basis of the throttle voltage and the engine speed Ne so as to obtain a lean air-fuel ratio. Then, the amount of fuel to be injected proportional to the target air-fuel ratio is set and the operation of the fuel injection valve 4 is controlled so as to perform fuel injection in accordance with the thus-set amount of fuel.

In a medium load region as in a constant speed running, a former-period injection lean mode or a stoichiometric feedback mode in FIG. 2 is selected according to a loading condition or the engine speed. In the former-period injection lean mode, the first air bypass valve 25 is controlled in the same way as in the control for the conventional idling speed control valve, a target air-fuel ratio is calculated in accordance with an intake air quantity signal provided from the air flow sensor 26 and the engine speed, and the amount of fuel to be injected is controlled so as to give a relatively lean air-fuel ratio.

In the stoichiometric feedback mode, as in the former-period injection lean mode, the first air bypass valve 25 is controlled in the same manner as in the control for the conventional idling speed control valve, while the second air bypass valve 28 is fully closed to prevent an excessive increase of the output. Further, the EGR valve 37 is controlled to a substantially fully closed state, and an air-fuel ratio feedback control is conducted in accordance with the output voltage of the $O_2$ sensor 34 so that the target air-fuel ratio becomes the stoichiometric ratio, whereby the amount of fuel to be injected is controlled.

In a high load region as in sudden acceleration or high-speed running, an open loop mode shown in FIG. 2 is selected. In this mode, the second air bypass valve 28 is closed, a target air-fuel ratio is set from the map so as to give a relatively rich air-fuel ratio, and the amount of fuel to be injected is controlled in accordance with the thus-set target air-fuel ratio.

When the throttle valve 29 is substantially fully closed in an inertial running or in deceleration state, a fuel cut-off mode shown in FIG. 2 is selected. In this mode, the supply of fuel into the combustion chamber 5 is stopped. Further, in this mode, when the engine is in a normal operating condition not including when the engine is cold and upon decrease of the engine speed Ne below a return rotational speed (first return rotational speed), the supply of fuel into the combustion chamber 5 is restarted (fuel return) in accordance with the latter-period injection lean mode (lean air-fuel ratio mode). On the other hand, in a specific operating condition, for example, when the engine is cold or in the event of fail safe (for example in the event of failure of the throttle position sensor 30, the high-pressure fuel pump 46, or the second fuel pressure regulator 50), and when the engine speed Ne becomes lower than a return rotational speed (second return rotational speed), the supply of fuel into the combustion chamber 5 is restarted (fuel return) in accordance with the intake air injection mode (stoichiometric ratio mode). Further, even when the driver depresses the accelerator pedal, the fuel cut-off mode is stopped immediately, and the supply of fuel into the combustion chamber 5 is restarted in a predetermined mode according to the state of operation.

The ECU 61 is provided with fuel cut-off rotational speed setting means for setting an engine speed, or a decision rotational speed, to stop the supply of fuel at the time of starting the fuel cut-off mode, for each of the former-period injection mode (suction stroke injection mode) and the latter-period injection mode (compression stroke injection mode). Further the ECU 61 is also provided with return rotational speed setting means for setting an engine speed, or a return rotational speed, to restart the supply of fuel from the fuel cut-off mode, for each of the former-period injection mode and the latter-period injection mode. The ECU 61 is further provided with idling speed setting means for setting an idling speed of the intra-cylinder injection engine 1 for each of the former- and latter-period injection modes.

The decision rotational speed set by the fuel cut-off lower-limit rotational speed setting means and the return rotational speed set by the return rotational speed setting means are set separately for each of the former- and latter-period injection modes. Also as to the idling speed set by the idling speed setting means, it is set separately for each of the former- and latter-period injection modes. More specifically, the decision rotational speed (first fuel cut-off starting rotational speed), the return rotational speed (first return rotational speed), and the idling speed (first target idling speed) in the latter-period injection mode superior in responsivity to the former-period injection mode are set lower than the decision rotational speed (second fuel cut-off starting rotational speed), the return rotational speed (second return rotational speed) and the idling speed (second target idling speed) in the former-period injection mode. The rotational speeds in question are set according to what type of a transmission is used, that is, whether the transmission used is a manual transmission or an automatic transmission, and also according to whether auxiliary devices, such as an air conditioner, are ON or OFF.

With reference to FIG. 3, a method as to how the decision rotational speed for starting the cut-off of fuel and the return rotational speed for restarting the supply of fuel are set will be described.

As shown in FIG. 3, decision rotational speeds (decision Ne) for starting the cut-off of fuel in the fuel cut-off mode are set respectively in the former-period injection mode and the latter-period injection mode. A decision Ne (first fuel cut-off lower-limit rotational speed, indicated with a dash-double dot line in the figure) in the latter-period injection mode is set lower than a Decision Ne (second fuel cut-off lower-limit rotational speed, indicated with a dot-dash line). Further, return rotational speeds (return Ne) for restarting the supply of fuel from the fuel cut-off mode are set respectively in the former- and latter-period injection modes. A Return Ne (first return rotational speed, indicated with a dash-double dot line in the figure) in the latter-period injection mode is set lower than a return Ne (second return rotational speed, indicated with a dot-dash line in the figure) in the former-period injection mode.

In the case where the vehicle decelerates at a low engine speed, for example, in order to stop during operation in the former-period injection mode, and when the engine speed Ne in that decelerating state is equal to or higher than Decision Ne (point A) in the former-period injection mode, as indicated with a solid line in FIG. 3, the supply of fuel is stopped and the fuel cut-off mode is started. When the engine speed Ne decreases gradually to the Return Ne (point B) in the former-period injection mode, the supply of fuel is restarted and the engine speed Ne is maintained at a predetermined rotational speed (idling condition). When the vehicle decelerates to stop during operation in the former-period injection mode and when the engine speed Ne in that decelerating state is lower than the Decision Ne (point A) in the former-period injection mode, the fuel cut-off mode is not started.

On the other hand, when the vehicle decelerates at a low engine speed, for example in order to stop, during operation in the latter-period injection mode and when the engine speed Ne is equal to or higher than the Decision Ne (point C) in the latter-period injection mode which is lower than the Decision Ne (point A) in the former-period injection mode, as indicated with a solid line in FIG. 3, the supply of fuel is stopped and the fuel cut-off mode is started. Thus, during operation in the latter-period injection mode, if the engine speed is equal to or higher than the Decision Ne (point C) in the latter-period injection mode which is lower than the Decision Ne (point A) in the former-period injection mode, the fuel cut-off mode is allowed to stop the supply of fuel. When the fuel cut-off mode is started and the engine speed Ne decreases gradually, passes the Return Ne (point B) in the former-period injection mode and further decreases to the Return Ne (point D) in the latter-period return mode, the supply of fuel is restarted and the engine speed Ne is maintained at a predetermined rotational speed (idling condition). When the vehicle decelerates to stop during operation in the latter-period injection mode and when the engine speed Ne in that decelerating state is lower than the Decision Ne (point C) in the latter-period injection mode, the fuel cut-off mode is not started.

Thus, during operation in the latter-period injection mode superior in both combustion and responsivity, the stop of fuel supply and the start thereof can be performed at a lower engine speed than in the former-period injection mode. Consequently, it becomes possible to effect fuel supply and stop in a wide engine speed range including not only a high speed range but also a low speed range of the engine. Besides, since the supply of fuel is started at a lower rotational speed, the number of times of fuel supply and stop is large, or the fuel supply and stop period becomes longer, whereby fuel economy can be improved without deterioration of combustion.

Although in the foregoing description the fuel infection mode returns to the same injection mode as to that before change-over to the fuel cut-off mode at the time of starting the supply of fuel from the fuel cut-off mode, no limitation is made thereto. The return may be made to the latter-period injection mode or to the former-period injection mode according to the state of operation at the time of starting the supply of fuel from the fuel cut-off mode.

When the fuel supply is to be restarted in the latter-period injection mode, the supply of fuel to one or plural cylinders is restarted before the restart of fuel supply to all the cylinders, at the stage where the engine speed has decreased to a predetermined speed on a higher rotational speed side than the Return Ne. Consequently, even if the Return Ne is set at a low rotational speed side, a torque shock can be diminished and it becomes possible to set the return Ne in the latter-period injection mode to a still lower rotational speed side.

Although in FIG. 3, the Decision Ne in the latter-period injection mode and the Return Ne in the former-period injection mode are in such a relation that the former is on a higher rotational speed side, the correlation of rotational speed can be changed according to operating conditions.

Next, with reference to FIG. 4, a description will be given below as to how the idling speed is set.

As shown in FIG. 4, idling speeds (Idle Ne) are respectively set in the former-period injection mode and the latter-period injection mode according to water temperatures. To be more specific, an Idle Ne (first target idling speed, indicated with a thin dash-double dot line in the figure) in the latter-period injection mode is set lower than an Idle Ne (second target idling speed, indicated with a thin dot-dash line in the figure) in the former-period injection mode. Further, return rotational speeds (Return Ne) are respectively set in the former- and latter-period injection modes according to water temperatures. A Return Ne (first return rotational speed, indicated with a thick dash-double dot line in the figure) is set lower than a Return Ne (second return rotational speed, indicated with a thick dot-dash line in the figure).

Thus, during an operation in the latter-period injection mode, which is superior in both combustion and responsivity, an idling is performed at a lower rotational speed than in the former-period injection mode, whereby the fuel economy can be improved without deterioration of combustion.

Usually, during an idling in a normal operating condition except when the engine is cold, the injection of fuel is performed in the latter-period injection mode, so the Idle Ne in the former-period injection mode is not used. However, during an idling in a specific operating condition such as a fail safe condition, for example, in the event of decrease in negative pressure of the brake master cylinder, a failure of the throttle position sensor 30, or a cold state of the engine, the injection of fuel is conducted in the former-period injection mode. For this reason, the Idle Ne is set in the former-period injection mode.

The aforesaid Decision Ne, the Return Ne, and the Idle Ne in the former- and latter-period injection modes are set at respective appropriate rotational speeds according to the type of transmission used, that is, whether the transmission used is a manual transmission or an automatic transmission. The respective rotational speeds are set also according to whether an air conditioner, for example, is ON or OFF. For example, the Idle Ne in the latter-period injection mode of a vehicle equipped with an automatic transmission is set at a lower rotational speed in the drive range than in the neutral range according to whether an auxiliary device such as an air conditioner is ON or OFF (setting of each rotational speed based on a load member which exerts an influence on the output of the engine and which is driven by the engine output shaft).

According to the control system of this embodiment, as described above, the Decision Ne, the Return Ne, and the Idle Ne in the latter-period injection mode, which is superior in both combustion and responsivity, are set on a lower rotational speed side than the Decision Ne, the Return Ne and the Idle Ne in the former-period injection mode.

Therefore, during operation in the latter-period injection mode, the fuel cut-off mode, as well as idling, can be carried out at a low engine speed. Consequently, it is possible to improve fuel economy without causing deterioration of combustion.

Further, in restarting the supply of fuel in the latter-period injection mode, the fuel supply is restarted from the fuel cut-off mode for only one or plural cylinders out of all the cylinders prior to decrease of the engine speed down to the Return Ne. As a result, not only a torque shock at the time of restarting the fuel supply can be diminished but also the Return Ne in the latter-period injection mode can be set at a still lower rotational speed.

Although the intra-injection type four-cylinder engine 1 has been described as an example of the internal combustion engine in the above embodiment, the present invention is also applicable to a single cylinder engine or a V-shaped six-cylinder engine.

Thus, the control system for internal combustion engine according to the present invention permits improvement of fuel economy without causing deterioration of combustion.

What is claimed is:

1. A control system for an intra-cylinder injection type internal combustion engine, comprising:

a fuel injection device for supplying a fuel directly into a combustion chamber of the internal combustion engine;

injection mode selecting means for selecting, according to a state of operation of the internal combustion engine, either a suction stroke injection mode in which a fuel injection is performed mainly in a suction stroke or a compression stroke injection mode in which the fuel injection is performed mainly in a compression stroke;

fuel injection control means for controlling said fuel injection device in accordance with the injection mode selected by said injection mode selecting means; and idling speed setting means for setting a first target idling speed for said compression stroke injection mode and a second target idling speed for the suction stroke injection mode, said idling speed setting means setting said first target idling speed at a lower speed than said second target idling speed.

2. A control system according to claim 1, wherein, during an idling state of the internal combustion engine, said injection mode selecting means selects said compression stroke injection mode in a normal operating condition of the internal combustion engine and selects said suction stroke injection mode in a specific operating condition of the internal combustion engine.

3. A control system according to claim 2, wherein said specific operating condition is a low temperature condition of the internal combustion engine or a fail safe condition against a trouble of at least one of various sensors or a trouble of a control based on the outputs of various sensors.

4. A control system according to claim 1, wherein said idling speed setting means selectively sets said first target idling speed and said second target idling speed according to the state of operation of a load member which exerts an influence on the output of the internal combustion engine and which is driven by an output shaft of the internal combustion engine.

5. A control system according to claim 1, further comprising:

engine temperature detecting means for detecting temperature of the engine, wherein said idling speed setting means sets respectively said first and second target idling speeds in accordance with the temperature detected by said engine temperature detecting means.

6. A control system according to claim 5, wherein said idling speed setting means sets respectively said first and second target idling speeds at lower speeds on a high engine temperature side than on a low engine temperature side.

7. A control system for an intra-cylinder injection type internal combustion engine, comprising:

a fuel injection device for supplying a fuel directly into a combustion chamber of the internal combustion engine;

injection mode selecting means for selecting one of a suction stroke injection mode in which a fuel injection is performed mainly in a suction stroke, a compression stroke injection mode in which the fuel injection is performed mainly in a compression stroke, and a fuel cut-off mode for stopping the injection of fuel, according to a state of an operation of the internal combustion engine;

fuel injection control means for controlling said fuel injection device in accordance with said suction stroke injection mode, said compression stroke injection mode, or said fuel cut-off mode, selected by said injection mode selecting means; and return rotational speed setting means for setting a first return rotational speed for restarting the supply of fuel at the time of return from said fuel cut-off mode to said compression stroke injection mode, and a second return rotational speed for restarting the supply of fuel at the time of return from said fuel cut-off mode to said suction stroke injection mode, said return rotational speed setting means setting said first return rotational speed at a lower speed than said second return rotational speed.

8. A control system according to claim 7, wherein, when selecting an injection mode for restarting the supply of fuel from said fuel cut-off mode, said injection mode selecting means selects said compression stroke injection mode in a normal operating condition of the internal combustion engine and selects said suction stroke injection mode in a specific operating condition of the internal combustion engine.

9. A control system according to claim 8, wherein said specific operating condition is a low temperature condition of the internal combustion engine or a fail safe condition against a trouble of at least one of various sensors or a trouble of a control based on the outputs of various sensors.

10. A control system according to claim 7, wherein said internal combustion engine has a plurality of cylinders, and at the time of restarting the supply of fuel for return to said compression stroke injection mode from said fuel cut-off mode, said return rotational speed setting means sets a return rotational speed for restarting the supply of fuel to a cylinder or cylinders out of said plural cylinders at a rotational speed higher by a predetermined speed than said first return rotational speed.

11. A control system according to claim 7, further comprising: fuel cut-off lower-limit rotational speed setting means for setting a first fuel cut-off lower-limit rotational speed which, on a low rotational speed side of the internal combustion engine, permits change-over from said compression stroke injection mode to said fuel cut-off mode and also for setting a second fuel cut-off lower-limit rotational speed which, on said lower rotational speed side, permits change-over from said suction stroke injection mode to said fuel cut-off mode, wherein said fuel cut-off lower-limit rotational speed setting means setting said first fuel cut-off lower-limit rotational speed at a lower speed than said second fuel cut-off lower-limit rotational speed.

12. A control system according to claim 7, wherein said return rotational speed setting means selectively sets said first return rotational speed and said second return rotational speed according to the state of operation of a load member which exerts an influence on an output of said internal combustion engine and which is driven by an output shaft of the engine.

13. A control system according to claim 7, further comprising:

temperature detecting means for detecting temperature of the engine, wherein said return rotational speed setting means sets respectively said first and second return rotational speeds in accordance with the temperature detected by said temperature detecting means.

14. A control system according to claim 13, wherein said return rotational speed setting means sets respectively said first and second return rotational speeds at lower speeds on a high temperature side of the engine temperature than on a low temperature side of the engine temperature.

15. A control system for an intra-cylinder injection type internal combustion engine, comprising:

a fuel injection device for supplying a fuel directly into a combustion chamber of the internal combustion engine;

injection mode selecting means for selecting, according to the state of operation of the internal combustion engine, one of a suction stroke injection mode in which a fuel injection is performed mainly in a suction stroke, a compression stroke injection mode in which the fuel injection is performed mainly in a compression stroke, and a fuel cut-off mode for stopping the injection of fuel;

fuel injection control means for controlling said fuel injection device in accordance with said suction stroke injection mode, said compression stroke injection mode, or said fuel cut-off mode, selected by said injection mode selecting means; and fuel cut-off lower-limit rotational speed setting means for setting a first fuel cut-off lower-limit rotational speed which, on a low rotational speed side of the internal combustion engine, permits change-over from said compression stroke injection mode to said fuel cut-off mode and also for setting a second fuel cut-off lower-limit rotational speed which, on said low rotational speed side, permits change-over from said suction stroke injection mode to said fuel cut-off mode, said fuel cut-off lower-limit rotational speed setting means setting said first fuel cut-off lower-limit rotational speed at a lower speed than said second fuel cut-off lower-limit rotational speed.

16. A control system according to claim 15, wherein said fuel cut-off lower-limit rotational speed setting means selectively sets said first fuel cut-off lower-limit rotational speed and said second fuel cut-off lower-limit rotational speed according to the state of operation of a load member which exerts an influence on an output of said internal combustion engine and which is driven by an output shaft of the engine.

* * * * *